(12) United States Patent
Huang

(10) Patent No.: US 9,041,425 B2
(45) Date of Patent: May 26, 2015

(54) DETECTING CIRCUIT FOR PIXEL ELECTRODE VOLTAGE OF FLAT PANEL DISPLAY DEVICE

(75) Inventor: Zhongshou Huang, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 689 days.

(21) Appl. No.: 13/100,637

(22) Filed: May 4, 2011

(65) Prior Publication Data

US 2012/0091997 A1 Apr. 19, 2012

(30) Foreign Application Priority Data

Oct. 14, 2010 (CN) .......................... 2010 1 0509158

(51) Int. Cl.
*G01R 31/26* (2014.01)
*G09G 3/36* (2006.01)
*G02F 1/13* (2006.01)

(52) U.S. Cl.
CPC ............ *G09G 3/3648* (2013.01); *G02F 1/1309* (2013.01); *G09G 2320/0209* (2013.01); *G09G 3/3614* (2013.01); *G09G 3/3655* (2013.01); *G09G 2320/0223* (2013.01)

(58) Field of Classification Search
USPC ........................................ 324/760.01, 760.02
See application file for complete search history.

(56) References Cited

U.S. PATENT DOCUMENTS

| | | | |
|---|---|---|---|
| 5,377,030 A * | 12/1994 | Suzuki et al. | 349/187 |
| 5,561,381 A * | 10/1996 | Jenkins et al. | 324/678 |
| 6,462,615 B1 * | 10/2002 | Tanghe | 327/560 |
| 6,842,200 B1 | 1/2005 | Su et al. | |
| 7,202,880 B2 * | 4/2007 | Takahashi | 345/690 |
| 7,280,167 B2 * | 10/2007 | Choi et al. | 349/12 |
| 7,576,556 B1 * | 8/2009 | Huang et al. | 324/760.01 |
| 2004/0169627 A1 | 9/2004 | Hong | |
| 2006/0232505 A1 * | 10/2006 | Asada | 345/55 |
| 2007/0024560 A1 | 2/2007 | Kim et al. | |
| 2007/0052646 A1 | 3/2007 | Ishiguchi | |
| 2008/0186269 A1 * | 8/2008 | Bu | 345/94 |

(Continued)

FOREIGN PATENT DOCUMENTS

| | | |
|---|---|---|
| CN | 1908741 A | 2/2007 |
| CN | 1928682 A | 3/2007 |

(Continued)

*Primary Examiner* — Huy Q Phan
*Assistant Examiner* — Dustin Dickinson
(74) *Attorney, Agent, or Firm* — Kilpatrick Townsend & Stockton LLP

(57) ABSTRACT

A detecting circuit for pixel electrode voltage of a flat panel display device, the flat panel display device having a plurality of scanning lines and a plurality of data lines crossing with the plurality of scanning lines, the plurality of scanning lines and data lines define a plurality of pixel units, and each of the pixel units including a pixel switching element and a pixel electrode. The detecting circuit for pixel electrode voltage includes at least one detecting sub-circuit for pixel electrode voltage. The detecting sub-circuit for pixel electrode voltage includes: a signal amplifying unit connected with the pixel electrode in the pixel unit, for amplifying a voltage signal of the pixel electrode; and a signal detecting unit connected with the signal amplifying unit, for detecting the voltage signal of the pixel electrode that has been amplified by the signal amplifying unit, and outputting a variation in the voltage signal of the pixel electrode with time. Compared with the prior art, the present invention has advantages of simple detecting circuit structure and accurate detection result.

14 Claims, 5 Drawing Sheets

(56) References Cited

U.S. PATENT DOCUMENTS

| | | | |
|---|---|---|---|
| 2008/0224983 A1* | 9/2008 | Lee et al. | 345/98 |
| 2009/0219035 A1* | 9/2009 | Apte | 324/555 |
| 2010/0039538 A1* | 2/2010 | Ikedo | 348/241 |
| 2010/0060600 A1* | 3/2010 | Wang et al. | 345/173 |
| 2010/0066650 A1* | 3/2010 | Lee et al. | 345/64 |
| 2010/0134457 A1* | 6/2010 | Katoh et al. | 345/207 |
| 2012/0313913 A1* | 12/2012 | Shiraki et al. | 345/207 |

FOREIGN PATENT DOCUMENTS

| | | |
|---|---|---|
| CN | 101118730 A | 2/2008 |
| CN | 101286306 A | 10/2008 |
| CN | 101510391 A | 8/2009 |
| KR | 10-2006-0018396 A | 3/2006 |
| KR | 20080034542 A | 4/2008 |

\* cited by examiner

DETECTING CIRCUIT FOR PIXEL ELECTRODE VOLTAGE OF FLAT PANEL DISPLAY DEVICE

CROSS REFERENCE TO RELATED APPLICATION

This application claims the benefit of priority to Chinese Patent Application No. 201010509158.3, entitled "Detecting Circuit for Pixel Electrode Voltage of Flat Panel Display Device", filed on Oct. 14, 2010 with State Intellectual Property Office of PRC, which is incorporated herein by reference in its entirety.

BACKGROUND OF THE INVENTION

1. Field of the Invention

The present invention relates to flat panel display technique, and particularly to a detecting circuit for pixel electrode voltage of a flat panel display.

2. Related Art

Liquid crystal display (LCD) devices have been widely used in various data processing equipments such as TV, notebook computer, mobile telephone, personal digital assistant, etc., due to the advantages of lighter weight, thinner thickness, smaller footprint, lower power consumption, lower radiation, and so on. With the continuous development of the electronic industry, the performance of the liquid crystal display devices is becoming better and better.

Taking the common thin film transistor LCD (TFT-LCD) as an example, it belongs to a type of active matrix liquid crystal display. The main feature of the TFT-LCD is that a semiconductor switching device is configured in each pixel point, and each pixel point is an independent transistor isolated from each other. Because each pixel point can be controlled directly by a point pulse, each pixel is relatively independent, and can be controlled continuously, which not only decreases the reaction time, but also can make it very accurate in gray scale control.

The ordinary liquid crystal device includes a liquid crystal display panel and a driving circuit for driving the liquid crystal display panel.

The liquid crystal display panel usually includes a color-film substrate and an array substrate. An array of M×N liquid crystal pixel units is arranged on a side of the array substrate that opposes to the color-film substrate. As shown in FIG. 1, taking any of the liquid crystal pixel units thereof as an example, it includes a scanning line GL, a data line DL crossing with the scanning line GL, and a thin film transistor (TFT) formed at the crossing of the scanning line GL and the data line DL to drive the liquid crystal pixel electrode. The scanning line GL is connected with the gate of the thin film transistor TFT to turn on the thin film transistor TFT; the data line DL is connected with the source of the thin film transistor TFT to supply voltage to the liquid crystal pixel electrode; and the liquid crystal pixel unit is connected with the drain of the thin film transistor. If a data voltage is applied to the pixel electrode that formed on the array substrate and a common electrode voltage Vcom is applied to the common electrode that located on the color-film substrate, the arrangement of the liquid crystal molecules is changed by the electric field that applied to the liquid crystal layer, thereby controlling the transmission amount of the ray, and displaying a corresponding image. In a pixel unit, a liquid crystal capacitor Clc is formed by the pixel electrode, the common electrode, and the liquid crystal molecules interposed therebetween, and the liquid crystal capacitor Clc is charged by the data line when the thin film transistor TFT is turned on, and makes the pixel electrode maintain the displaying voltage after the thin film transistor TFT is turned off until the thin film transistor is turned on next time. In view of the effect of the electric leakage of the liquid crystal capacitor Clc, a storage capacitor Cst is connected in parallel with the liquid crystal capacitor Clc. Moreover, a parasitic capacitor Cgs is provided between the gate terminal of the thin film transistor TFT connected with the scanning line GL and the source terminal of the thin film transistor TFT connected with the pixel electrode.

FIG. 2 shows a diagram of the electric potential variation of a voltage signal Vpixel of the liquid crystal pixel electrode with the variation of a gate driving pulse Vg and a data voltage Vdata. As shown in FIG. 2, a gate driving pulse Vg is applied to the scanning line GL to turn on the thin film transistor; when the gate driving pulse Vg is kept at a high gate voltage, i.e. the thin film transistor is turned on during the scanning period, a signal is applied to the pixel electrode by the data voltage Vdata, i.e. the liquid crystal capacitor Clc is charged, and a charging voltage may be kept for a constant time, the charging voltage also serving as the voltage for charging the storage capacitor Cst. It can be seen from FIG. 2 that, because of a kickback voltage caused by the parasitic capacitance of the thin film transistor, a voltage jump (labeled in circles in FIG. 2) occurs in the voltage signal Vpixel of the pixel electrode at the falling edge of the gate driving pulse, which in combination with the electric leakage of the thin film transistor switch and the image crosstalk may cause the voltage signal Vpixel of the pixel electrode to deviate from the given signal voltage. When the signal voltage Vpixel of each pixel electrode is not the voltage appropriate for the electronic image, the image contrast, the image flicker extent, the image residual extent, the image color saturation, the image gray scale, the GAMMA characteristic and the fidelity of the output optical image from the liquid crystal panel may distort.

Therefore, this type of asymmetric electric potential drift has to be calibrated by voltage compensation. Generally, the symmetry of the voltage signal of the pixel electrode can be achieved by adjusting the common electrode voltage Vcom to Vcom'. However, the approach of adjusting the common electrode voltage is applicable only to the case that the electric potential variations of all the liquid crystal pixel electrodes are the same. And in other cases, because the variations of the kickback voltages in different liquid crystal pixel electrodes are not the same, the approach of adjusting the common electrode voltage Vcom can not be adopted to compensate the voltage.

Nowadays, it has been proposed in the industry that the non-uniform kickback voltage may be compensated by balancing the resistance and the capacitance of the scanning line. A "liquid crystal panel having compensation capacitors for balancing RC delay effect" is provided in U.S. Pat. No. 6,842,200, in which the products of multiplication of resistance values and capacitance values of respective leads are made to be close to each other mainly by additionally providing a plurality of compensation capacitors (having predetermined capacitance value) connected to a plurality of leads respectively, so as to reduce the RC delay effect among the leads. However, the method mentioned above has the problems of design constraints and complex fabrication process, and it is difficult to acquire an exact capacitance value in the practical application.

In another aspect, if the deviation of the pixel electrode voltage is knowable, a compensation component with an opposite polarity can be applied to the common electrode. However, in the prior art, because of the lack of method for directly detecting the voltage of the pixel electrode, the voltage variation of the pixel electrode is substantially estimated indirectly from experience and computer simulation in the existing TFT array design and error detection correction, so that the voltage deviation of the signal is uniformly compensated for the product or a batch of products. However, this compensational adjustment has the following drawbacks: being complex in operation, and being time-consuming and energy-consuming; because the voltage variation of the pixel electrode is estimated indirectly from experience and the computer simulation, it can not be assured to obtain the exact voltage variation of the pixel electrode, which may affect the subsequent compensation result; and it is inconvenient to perform individual processing to compensate the aging and the drift of the product during usage in time for each product in the practical application. Moreover, if the pixel electrode voltage is inducted by an external induction circuit (such as an amplifier or an oscilloscope etc.), because the capacitance value of the induction circuit itself may apparently affect the liquid crystal pixel unit having a small capacitance value (0.1 pF to 1 pF), the variation of the pixel voltage can not be detected accurately as well.

SUMMARY OF THE INVENTION

The problem solved by the present invention is to provide a detecting circuit for pixel electrode voltage of a flat panel display device, to avoid the problems in the prior art of complex structure of the detecting circuit for pixel electrode voltage, or lower accuracy in detecting the pixel electrode voltage caused by the influence of its electronic characteristics on the pixel electrode, and so on.

To solve the problems mentioned above, a detecting circuit for pixel electrode voltage of a flat panel display device is provided in the present invention. The flat panel display device has a plurality of scanning lines and a plurality of data lines crossing with the plurality of scanning lines, the plurality of scanning lines and data lines define a plurality of pixel units, and each of the pixel units includes a pixel switching element and a pixel electrode. The detecting circuit for the pixel electrode voltage includes: at least one detecting sub-circuit for pixel electrode voltage, each of which including: a signal amplifying unit connected with the pixel electrode in the pixel unit, for amplifying a voltage signal of the pixel electrode; and a signal detecting unit connected with the signal amplifying unit, for detecting the amplified voltage signal of the pixel electrode by the signal amplifying unit, and for outputting a variation in the voltage signal of the pixel electrode with time.

Optionally, the pixel switching element is a thin film transistor, which includes specifically: a gate connected electrically to one of the plurality of scanning lines, for controlling the thin film transistor to turn on or off; a source connected electrically to one of the plurality of data lines, for receiving a data signal; and a drain, connected electrically to the pixel electrode.

Optionally, the flat panel display device is in a frame inversion mode or a line inversion mode, and respective pixel electrodes in a row of pixel units of the flat panel display device are connected in parallel to the signal amplifying unit of the detecting sub-circuit for pixel electrode voltage.

Optionally, the flat panel display device is in a dot inversion mode, and respective pixel electrodes of which the polarities vary uniformly in a row of pixel units of the flat panel display device are connected in parallel to the signal amplifying unit of the detecting sub-circuit for pixel electrode voltage.

Optionally, respective pixel electrodes in a first row and a last row of the pixel units of the flat panel display device are connected to the signal amplifying units of two detecting sub-circuits for pixel electrode voltage respectively.

Optionally, the pixel electrodes in first and last pixel unit of the first row of pixel units of the flat panel display device are connected to the signal amplifying units of two detecting sub-circuits for pixel electrode voltage respectively.

Optionally, each of the pixel electrodes connected to the signal amplifying unit of each detecting sub-circuit for pixel electrode voltage is a dummy pixel electrode of the flat panel display device.

Optionally, the signal amplifying unit is a MOS transistor having a gate connected with the pixel electrode of the pixel unit.

Optionally, the detecting sub-circuit for pixel electrode voltage further includes a preset unit located between the MOS transistor serving as the signal amplifying unit and the pixel electrode of the pixel unit connected thereto, for presetting characteristics of the MOS transistor serving as the signal amplifying unit.

Optionally, the preset unit is a MOS transistor having a drain connected with the gate of the MOS transistor serving as the signal amplifying unit.

Optionally, the signal amplifying unit is a source follower.

Optionally, the source follower includes a first MOS transistor and a second MOS transistor; the gate of the first MOS transistor serves as an input terminal connected with the pixel electrode, the source of the first MOS transistor is grounded, the drain of the first MOS transistor is connected with the drain of the second MOS transistor to serve as an output terminal, and the gate and the source of the second MOS transistor are both connected with a supply voltage.

Optionally, the source follower further includes a preset terminal located at the gate of the first MOS transistor, for presetting the characteristics of the source follower.

Optionally, the flat panel display device is a thin film transistor liquid crystal display device.

The present invention provides a detecting circuit for pixel electrode voltage of a flat panel display device, in which a voltage signal of the pixel electrode can be amplified by the signal amplifying unit therein, so it is convenient to observe the voltage signal of the pixel electrode, then to detect the voltage signal variation of the pixel electrode with time. Compared with the prior art, the present invention has advantages of a simple detecting circuit and an accurate detection result.

DESCRIPTION OF THE PREFERRED EMBODIMENTS

Figure 1:
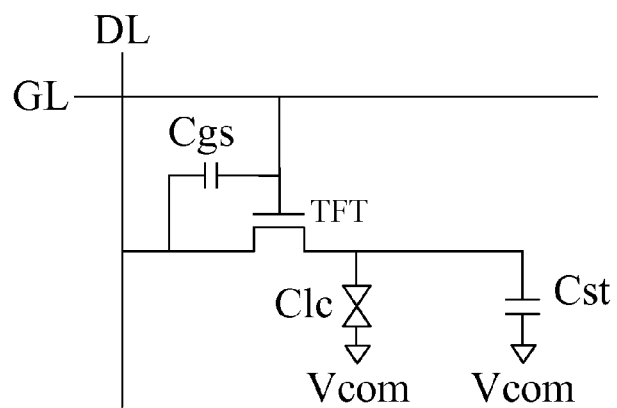
FIG. 1 is a schematic diagram of a liquid crystal display device in the prior art.
Figure 2:
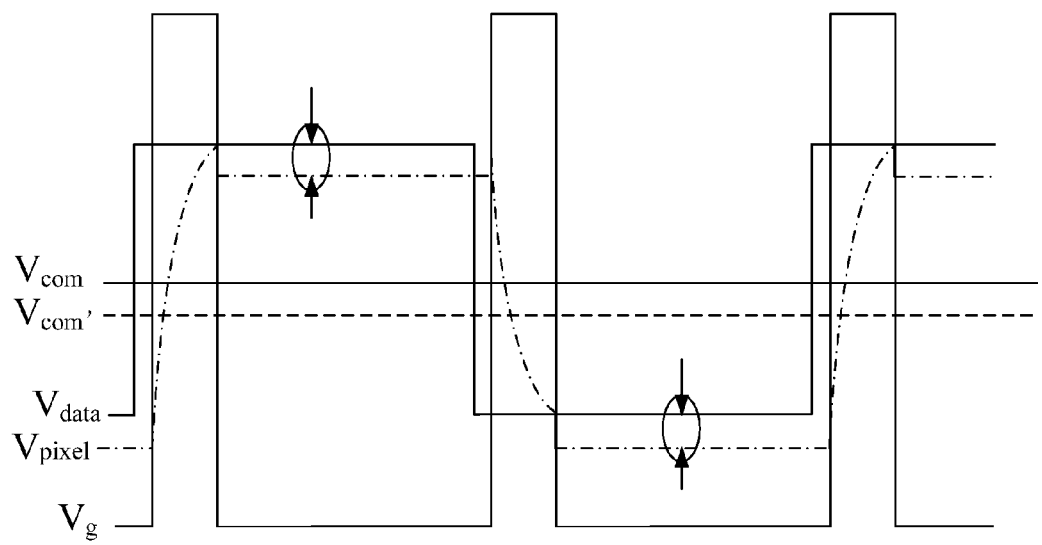
FIG. 2 shows a diagram of an electric potential variation of a liquid crystal pixel electrode with the variation of a gate driving pulse and a data voltage.

The inventor of the present invention finds that, in the existing techniques for detecting the pixel electrode voltage for flat plane display device including thin film transistor liquid crystal display device, low temperature poly-silicon organic light-emitting display device, electronic paper display device, etc., because of the lack of method for directly detecting the voltage of the pixel electrode, generally the voltage variation of the pixel electrode is estimated indirectly from experience and computer simulation, and the voltage deviation of the pixel electrode is uniformly compensated for the product or a batch of products according to the indirectly estimated result. However, this compensational adjustment has some problems, such as inaccurate detection of the voltage variation of the pixel electrode, inadequate compensation of the voltage of the pixel electrode, and the complexity in operation, etc. Moreover, in other cases, if the pixel electrode voltage is inducted by an external induction circuit, because the capacitance value of the induction circuit itself is higher, the pixel unit having a inherently small capacitance value would be apparently affected, the detection results would be affected, and the voltage variation of the pixel electrode of the pixel unit can not be detected accurately, which is adverse to the subsequent compensation to the voltage of the pixel unit as well.

Before a detailed description of the technical contents of the present invention, it is noted that in the following embodiments the flat plane display device is illustrated by taking a thin film transistor liquid crystal display device (TFT-LCD) as an example, but it is not limited to the thin film transistor liquid crystal display device. And for a convenient description, the structure of the thin film transistor liquid crystal display device is simplified herein, to describe only the components that the embodiments involve, which is not intended to limit the scope of protection of the present invention thereto.

A detecting circuit for pixel electrode voltage of a flat plane display device is provided in the present invention. The flat plane display device has a plurality of scanning lines and a plurality of data lines crossing with the plurality of scanning lines, the plurality of scanning lines and the plurality of data lines define a plurality of pixel units, and each of the pixel units has a common electrode, a pixel switching element connected to the scanning line and the data line, and a pixel electrode connected to the pixel switching element. The detecting circuit for pixel electrode voltage includes at least one detecting sub-circuit for pixel electrode voltage, and each of the at least one detecting sub-circuit for pixel electrode voltage includes: a signal amplifying unit connected with the pixel electrode in the pixel unit, for amplifying a current signal of the pixel electrode; and a signal detecting unit connected with the signal amplifying unit, for detecting the amplified voltage signal of the pixel electrode from the signal amplifying unit, and outputting a variation in the voltage signal of the pixel electrode with time.

Figure 3:
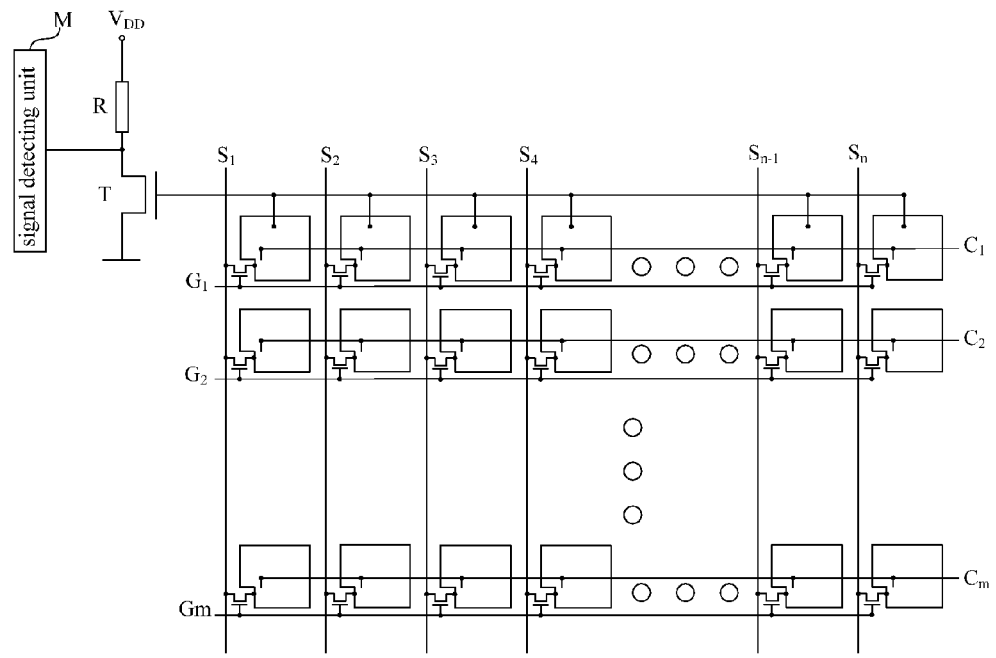
FIG. 3 shows a schematic structural diagram of a detecting circuit for pixel electrode voltage according to a first embodiment of the present invention used in a thin film transistor liquid crystal display device.

FIG. 3 shows a schematic circuit structure diagram of a detecting circuit for pixel electrode voltage according to a first embodiment of the present invention used in a thin film transistor liquid crystal display device. FIG. 3 is an illustrative explanation, and only a part of the thin film transistor liquid crystal display device is shown; furthermore, the structure of the liquid crystal display device is simplified and partly omitted herein, and only the components that are related to the embodiments of the present invention are shown, which is not intended to limit the scope of protection thereto. As shown in FIG. 3, the liquid crystal display device includes an active matrix region, and the active matrix region includes: pixel units including thin film transistors (TFTs) serving as switching elements and pixel electrodes connected with drains of the TFTs; a plurality of scanning lines $G_1, G_2, \ldots, G_m$ (m is a natural number) extending in a horizontal direction and connected to gates of the TFTs in the pixel units respectively, adapted to supply to the pixel units scanning signals for turning on the TFTs; a plurality of data lines $S_1, S_2, S_3, S_4, \ldots, S_{n-1}, S_n$ (n is a natural number) extending in a vertical direction and connected to sources of the TFTs in the pixel units respectively, adapted to supply data signals to the pixel electrodes of the pixel units; and common electrode lines $C_1, C_2, \ldots, C_m$ (m is a natural number) extending in the horizontal direction and connected to common electrodes in the pixel units separately, adapted to supply a common voltage signal to the common electrodes of the pixel units.

In practical application, the common voltage signal is applied to the common electrodes of all the pixel units, and the scanning signal is applied to the scanning line, so as to turn on the TFT in the pixel unit. In the case that the TFT is turned on, the data signal on the data line is applied to the pixel electrode.

Because of a kickback voltage caused by a parasitic capacitance of the TFT, a voltage signal of the pixel electrode may occur a voltage jump at the falling edge of a gate driving pulse, flicker and image residual may then appear on a shown image, and the color saturation of the image, the gray scale of the image, the GAMMA characteristics and the fidelity may distort.

In view of this, a detecting circuit for pixel electrode voltage is provided in the present invention for accurately detecting the variation of the pixel electrode voltage, so as to facilitate the subsequent voltage adjustment (such as changing the size of the common electrode) for eliminating the image defect caused by the kickback voltage.

Still referring to FIG. 3, the liquid crystal display device further includes a detecting circuit for pixel electrode voltage located outside the active matrix. The voltage detecting circuit includes a voltage detecting sub-circuit including a MOS transistor T serving as a signal amplifying unit and a signal detecting unit M connected with the MOS transistor T. A gate of the MOS transistor T is connected with the pixel electrode of the pixel unit in the active matrix region; a source of the MOS transistor T is connected with a source voltage VDD; and a drain of the MOS transistor T is grounded. The MOS transistor T has a load resistor R, and an output terminal of the MOS transistor T is led out at the load resistor R, the output terminal being connected with the signal detecting unit M. In the present embodiment, the pixel electrodes in all the pixel units in the first row are connected in parallel with the gate of the MOS transistor T, and the current signals of the pixel electrodes connected thereto are amplified by the MOS transistor T.

Herein, the reason why the pixel current signal is amplified by the MOS transistor T is that, the capacitance of the gate of the MOS transistor T can be very small (the capacitance of the gate of the MOS transistor T is less than 1/10 of the total capacitance of the pixel electrodes connected thereto) and the connection of each pixel electrode with the gate of the MOS transistor T has little effect on the voltage of the pixel electrode, so that the total voltage may keep substantially unchanged.

Figure 4:
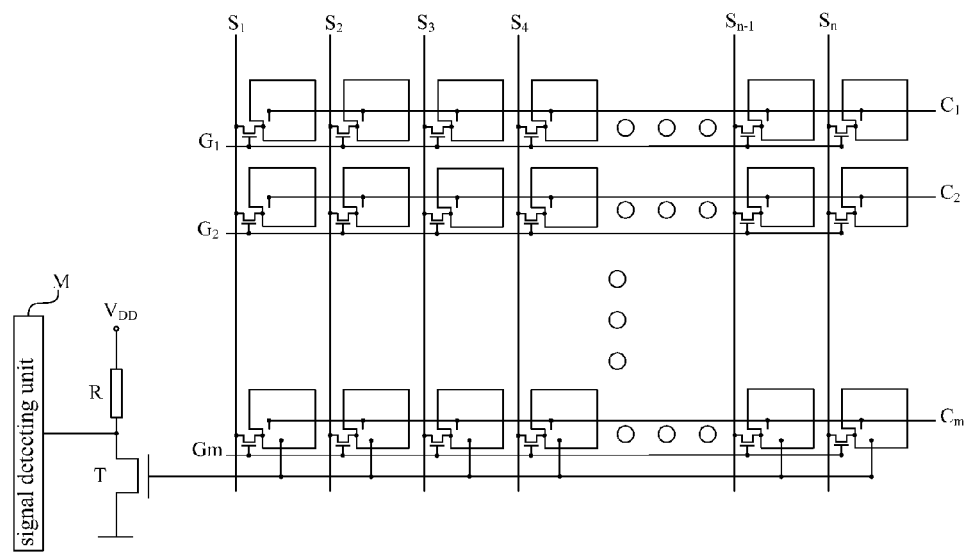
FIG. 4 shows a schematic structural diagram of a modification of FIG. 3.

In another aspect, the approach of connecting the pixel electrodes in all the pixel units in the first row with the gate of the MOS transistor T has the following advantages: 1) the pixel electrode in the pixel unit connected with the MOS transistor T can be configured as a dummy pixel electrode and the pixel unit connected with the MOS transistor T does not display image content when the image is being displayed, therefore in the present embodiment, the pixel electrodes of the pixel units in the first row that have less effect on the displayed image content and are configured as the dummy pixel electrodes are selected, which can ensure that excessive pixel units would not be occupied and no useful display content would be sacrificed; 2) the parasitic capacitance of the gate of the MOS transistor T and the input capacitance of the MOS transistor T may cause attenuation to the signal of the pixel electrode connected thereto, and it is proven in practice that the more the pixel electrodes connected in parallel with the MOS transistor T are and the less the effect is, therefore in the present embodiment, the pixel electrodes of all the pixel units in the first row are connected with the MOS transistor T, in order to reduce the attenuation of the signal as much as possible. Certainly, in other modifications, it is not limited only to the pixel units in the first row, and for example all the pixel electrodes of the pixel units in the last row can also be connected with the MOS transistor T, as shown in FIG. 4, which should have the same effect and will not be described herein.

Additionally, in the detecting circuit for pixel electrode voltage according to the first embodiment, the approach of connecting all the pixel electrodes in pixel units in the first row with the gate of the MOS transistor T is applicable in a frame inversion mode or a line inversion mode of the liquid crystal display device. In the frame inversion mode or the line inversion mode, the polarities of the voltage differences in respective pixel electrodes of each row of pixel units are the same.

When the detecting circuit for pixel electrode voltage shown in FIG. 3 is used, the pixel voltages of the pixel electrodes of all the pixel units in the first row, which serve as the gate voltage of the MOS transistor T, can modulate the source-to-drain current of the MOS transistor T. Specifically, the voltage signal of the gate of the MOS transistor T controls the source-to-drain current signal of the MOS transistor T, and then the current signal controls the voltage signal of the output terminal at the load resistor of the MOS transistor T. It is easy to know that, the source-to-drain current of the MOS transistor T is proportional to the square of the gate voltage thereof. Therefore, a tiny variation of the voltage signal at the gate of the MOS transistor T may cause a great variation of the current signal at the source and drain of the MOS transistor T, and then cause a great variation of the voltage signal at the output terminal of the MOS transistor T. Subsequently, signal detecting unit M can detect the voltage signal at the output terminal of the MOS transistor T, calculate the variation of the voltage signal applied at the gate of the MOS transistor T according to the variation of the voltage signal at the output terminal, and output the variation of the pixel electrode voltage signal corresponding to the voltage signal with time. In the present embodiment, the signal detecting unit M may be an oscilloscope which can perform an analog-to-digital (A/D) conversion on voltage signal and display the voltage signal variation with time in an graphic form (such as a wave form curve). The variation of the pixel electrode voltage can be detected conveniently and accurately by the detecting circuit for pixel electrode voltage mentioned above, even in the case that the variation of the pixel electrode voltage is very small.

Figure 5:
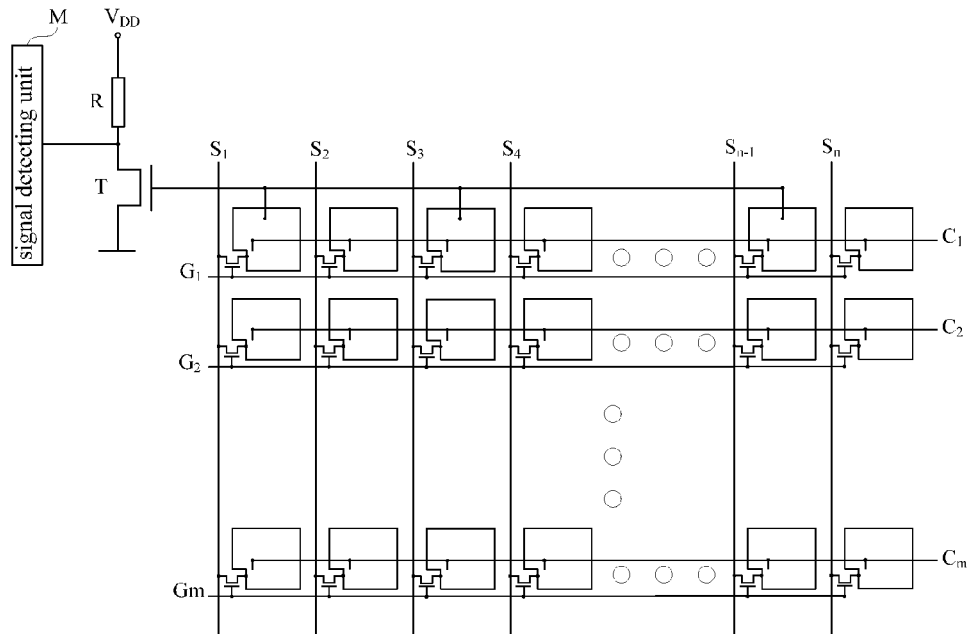
FIG. 5 shows a schematic structural diagram of a detecting circuit for pixel electrode voltage according to a second embodiment of the present invention used in a thin film transistor liquid crystal display device.

FIG. 5 shows a schematic structural diagram of a detecting circuit for pixel electrode voltage according to a second embodiment of the present invention used in a thin film transistor liquid crystal display device.

In the second embodiment, the components same as or similar to those in the first embodiment are indicated by same or similar component numerals, and a detailed explanation thereof is omitted herein, to make the description of the present invention be clear and intelligible.

The major difference of the second embodiment from the first embodiment lies in the connection between the pixel electrode of the pixel unit and the MOS transistor T serving as the signal amplifying unit. In the second embodiment, the pixel electrodes of the pixel units located in the odd columns of the first row are connected with the gate of the MOS transistor T.

Figure 6:
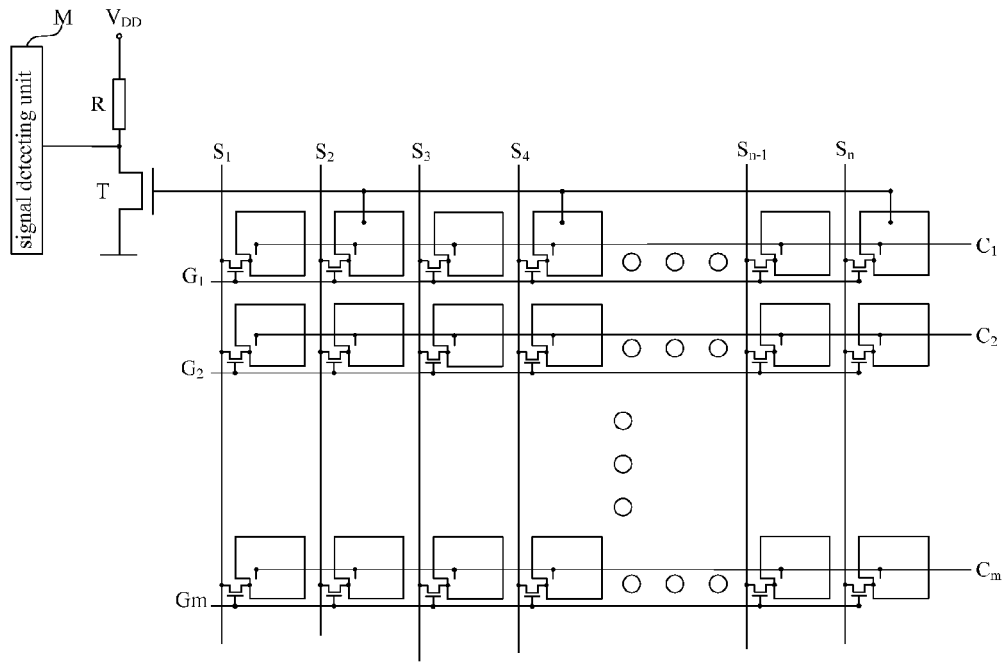
FIG. 6 shows a schematic structural diagram of a modification of FIG. 5.

In the detecting circuit for pixel electrode voltage according to the second embodiment, the approach of connecting the pixel electrodes of the pixel units located in the odd columns of the first row with the gate of the MOS transistor T is applicable in a dot inversion mode of the liquid crystal display device. In the dot inversion mode, the polarities of the voltage differences applied to the pixel electrodes of the adjacent pixel units are opposite to each other in any direction, so that the polarities of the voltage differences at the pixel electrodes of the pixel units located in the odd columns of the first row are the same in the dot inversion mode. Certainly, in other modifications, it is not limited only to the pixel units located in the odd columns of the first row, and for example the pixel electrodes of the pixel units located in the even columns of the first row (the polarities of the voltage differences at the pixel electrodes of the pixel units in the even columns are the same in the dot inversion mode) can also be connected with the gate of the MOS transistor T, as shown in FIG. 6; alternatively, the pixel electrodes of the pixel units located in the odd columns in the last row can also be connected with the gate of the MOS transistor T; alternatively, the pixel electrodes of the pixel units located in the even columns of the last row can also be connected with the gate of the MOS transistor T, which will have similar effect and will not be described herein.

Figure 7:
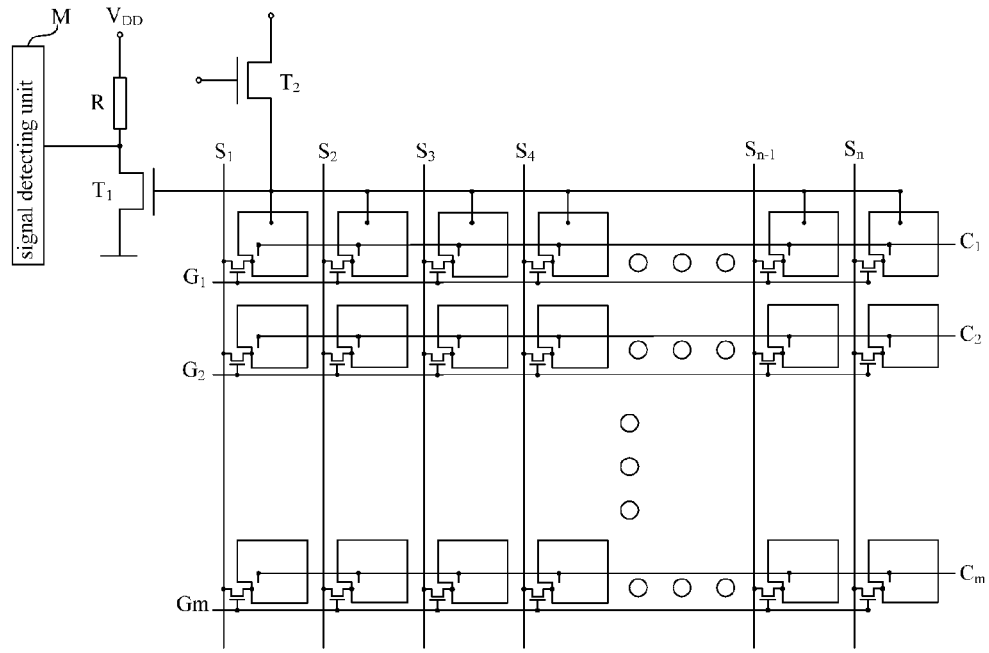
FIG. 7 shows a schematic structural diagram of a detecting circuit for pixel electrode voltage according to a third embodiment of the present invention used in a thin film transistor liquid crystal display device.

FIG. 7 shows a schematic structural diagram of a detecting circuit for pixel electrode voltage according to a third embodiment of the present invention used in a thin film transistor liquid crystal display device.

In the third embodiment, the components same as or similar to those in the first embodiment are indicated by same or similar component numerals, and a detailed explanation thereof is omitted herein, to make the description of the present invention be clear and intelligible.

The major difference of the third embodiment from the first embodiment lies in that the detecting sub-circuit for pixel electrode voltage further includes a MOS transistor $T_2$ serving as a preset unit. The MOS transistor $T_2$ is located between the MOS transistor $T_1$ serving as the signal amplifying unit and the pixel electrode of the pixel unit connected with the MOS transistor $T_1$, and the drain of the MOS transistor $T_2$ is connected with the gate of the MOS transistor $T_1$, in order to preset the characteristics of the MOS transistor $T_1$ serving as the signal amplifying unit.

Specifically, the preset includes that: when a reference voltage (for example 15V) is applied to the gate of the MOS transistor $T_2$, the MOS transistor $T_2$ is turned on, thereby an external circuit (not shown in FIG. 7) connected with the source of the MOS transistor $T_2$ can preset the MOS transistor $T_1$ to characterize the MOS transistor $T_1$. After the preset is finished, the MOS transistor $T_2$ is turned off, and the voltage signal of the pixel electrode is amplified by the MOS transistor $T_1$ as described in the first embodiment, in which the capacitance of the turned off MOS transistor $T_2$ is very small, and may not affect the MOS transistor $T_1$.

Figure 8:
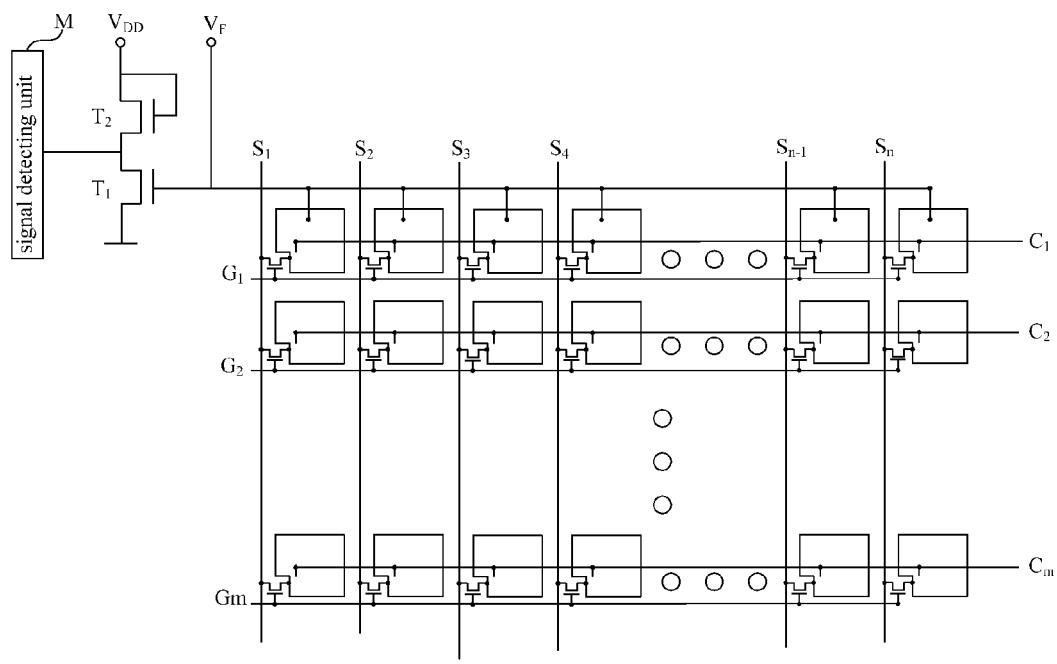
FIG. 8 shows a schematic structural diagram of a detecting circuit for pixel electrode voltage according to a fourth embodiment of the present invention used in a thin film transistor liquid crystal display device.

FIG. 8 shows a schematic structural diagram of a detecting circuit for pixel electrode voltage according to a fourth embodiment of the present invention used in a thin film transistor liquid crystal display device.

In the fourth embodiment, the components same as or similar to those in the first embodiment are indicated by same or similar component numerals, and a detailed explanation thereof is omitted herein, to make the description of the present invention be clear and intelligible.

The major difference of the fourth embodiment from the first embodiment lies in that the MOS transistor T is replaced by a source follower SF to serve as the signal amplifying unit. In the fourth embodiment, the pixel electrodes of all the pixel units in the first row are all connected with the source follower SF.

The source follower SF includes a first MOS transistor $T_1$ and a second MOS transistor $T_2$; the gate of the first MOS transistor $T_1$ serves as an input terminal connected with each pixel electrode, the source of the first MOS transistor $T_1$ is grounded, the drain of the first MOS transistor $T_1$ is connected with the drain of the second MOS transistor $T_2$ to serve as an output terminal, and the gate and the source of the second MOS transistor $T_2$ are both connected with the supply voltage VDD. Moreover, in the present embodiment, the source follower SF further includes a preset terminal VF located at the gate of the first MOS transistor $T_1$, adapted to preset the characteristics of the source follower SF. Similarly, in other modifications, it is not limited only to the pixel units in the first row, and for example all the pixel electrodes of the pixel units in the last row can also be connected with the source follower SF, which will have the same effect, and will not be described herein.

Specifically, the preset of the characteristics of the source follower SF includes that: when a reference voltage (for example 15V) is applied to the preset terminal VF at the gate of the MOS transistor $T_1$, the source follower SF (mainly the MOS transistor $T_1$ in the source follower SF) can be preset to characterize the source follower SF. After the preset is finished, the preset terminal VF is floated, and the voltage signal of the pixel electrode is amplified by the source follower SF.

When the detecting circuit for pixel electrode voltage shown in FIG. 8 is used, the source-to-drain current flowing through the first MOS transistor $T_1$ and the second MOS transistor $T_2$ can be modulated by the voltage of the pixel electrodes of all the pixel units in the first row serving as an input voltage of the source follower SF. Specifically, the voltage signal of the gate of the MOS transistor T controls the current signal flowing through the sources and drains of the first MOS transistor $T_1$ and the second MOS transistor $T_2$, and then the current signal controls the voltage signal of the output terminal of the source follower SF. It is easy to know that, the current flowing through the sources and drains of the first MOS transistor $T_1$ and the second MOS transistor $T_2$ is proportional to the square of the input voltage of the source follower SF. Therefore, a tiny variation of the voltage signal at the gate of the first MOS transistor $T_1$ may cause a great variation of the current signal flowing through the sources and drains of the first MOS transistor $T_1$ and the second MOS transistor $T_2$, and then cause a great variation of the voltage signal at the output terminal of the source follower SF. Subsequently, the signal detecting unit M can detect the voltage signal of the output terminal of the source follower SF, calculate the variation of the voltage signal applied at the input terminal of the source follower SF according to the variation of the voltage signal of the output terminal, and output the voltage signal variation of the pixel electrode corresponding to the voltage signal with time.

Figure 9:
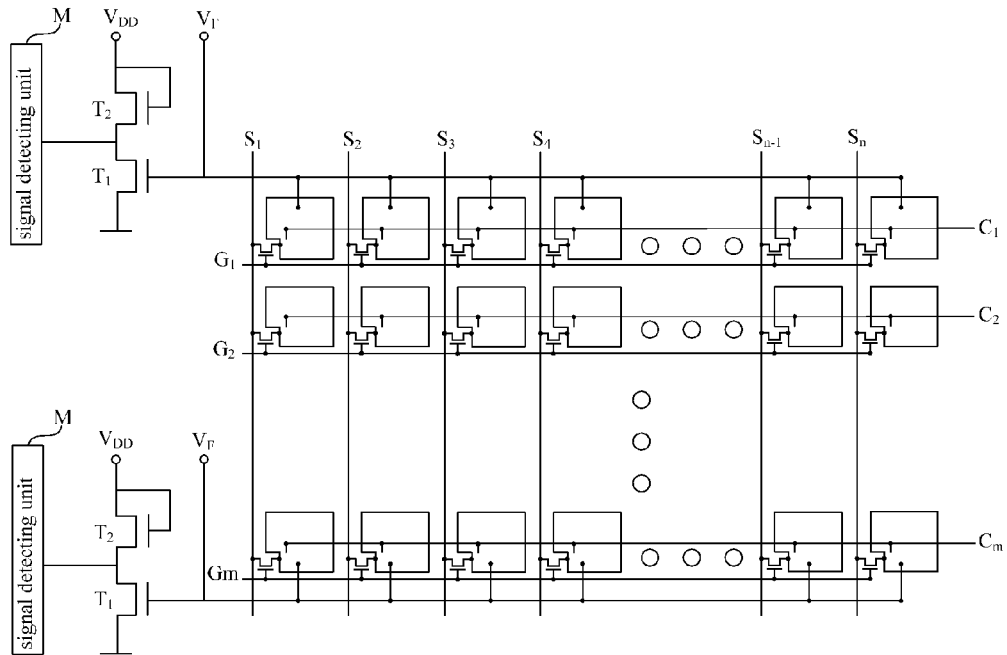
FIG. 9 shows a schematic structural diagram of a detecting circuit for pixel electrode voltage according to a fifth embodiment of the present invention used in a thin film transistor liquid crystal display device.

FIG. 9 shows a schematic structural diagram of a detecting circuit for pixel electrode voltage according to a fifth embodiment of the present invention used in a thin film transistor liquid crystal display device.

In the fifth embodiment, the components same as or similar to those in the fourth embodiment are indicated by same or similar component numerals, and a detailed explanation thereof is omitted herein, to make the description of the present invention be clear and intelligible.

The major difference of the fifth embodiment from the fourth embodiment lies in that a detecting circuit for pixel electrode voltage having two detecting sub-circuits for pixel electrode voltage is provided, one of the voltage detecting sub-circuit is adapted for the pixel units in the first row, and the other voltage detecting sub-circuit is adapted for the pixel units in the last row, and each of the voltage detecting sub-circuits includes a source follower SF serving as a signal amplifying unit and a signal detecting unit M connected with the source follower SF. Specifically, the pixel electrodes of pixel units in the first row are all connected with the source follower SF in the first voltage detecting sub-circuit, and the pixel electrodes of pixel units in the last row are all connected with the source follower SF in the second voltage detecting sub-circuit.

Because the pixel electrode in the pixel unit connected with the source follower SF may serve as a dummy pixel, the pixel unit connected with the source follower SF will not display image content when the image is being displayed, therefore in the present embodiment, the pixel electrodes in the pixel units in the first row and the pixel units in the last row that have less effect on the displayed image content are selected.

Compared with the fourth embodiment, in the fifth embodiment, not only the voltage variation of the pixel electrodes of the pixel units in the first row but also that in the last row can be detected. Moreover, the voltage variations of the pixel electrodes of the pixel units in each row from up to low in the active matrix region can be estimated approximately according to the voltage variations of the pixel electrodes of the pixel units in the first row and the last row. For example, it is assumed that the voltage variation of the pixel electrode of the pixel unit in the first row is $V_1(t)$ and the voltage variation of the pixel electrode of the pixel unit in the last row is $V_m(t)$, a subtraction of the former from the latter resulting $\Delta V_r(t) = V_m(t) - V_1(t)$; it is further assumed that the voltage variation of the pixel electrode of the pixel unit from one row to another is linear or approximate linear, then the difference between voltage variations of the pixel electrodes of the pixel units between two adjacent rows is $\Delta V(t) = \Delta V_r(t)/(m-1)$, thereby the voltage variation of the pixel electrode of the pixel unit in the h-th row in the active matrix region is $V_h(t) = V_1(t) + (h-1)*\Delta V(t)$. In the same way, the voltage variations of the pixel electrodes of the pixel units in all rows in the active matrix region are obtained, which facilitates subsequent voltage compensation. Certainly, what mentioned above is only an illustrative explanation other than a limitation to the scope of the present invention, and it is not intended that the voltage variation of the pixel electrode of the pixel unit in each row has to comply strictly with the above variation pattern, and there are also other modifications.

Figure 10:
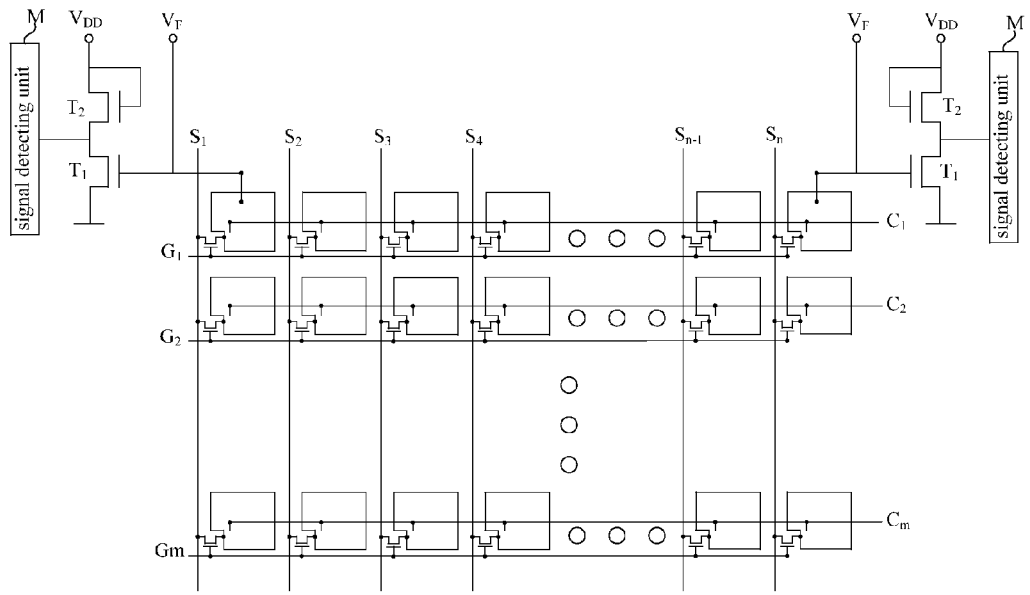
FIG. 10 shows a schematic structural diagram of a detecting circuit for pixel electrode voltage according to a sixth embodiment of the present invention used in a thin film transistor liquid crystal display device.

FIG. 10 shows a schematic structural diagram of a detecting circuit for pixel electrode voltage in a sixth embodiment of the present invention used in a thin film transistor liquid crystal display device.

In the sixth embodiment, the components same as or similar to those in the fifth embodiment are indicated by same or similar component numerals, and a detailed explanation thereof is omitted herein, to make the description of the present invention be clear and intelligible.

The major difference of the sixth embodiment from the fifth embodiment lies in that the connection between the detecting circuit for pixel electrode voltage that has two detecting sub-circuits for pixel electrode voltage and the pixel electrode of the pixel unit is different. In the sixth embodiment, one of the voltage detecting sub-circuits is adapted for the first pixel unit in the first row, and the other voltage detecting sub-circuit is adapted for the last pixel unit in the first row. Specifically, the pixel electrode of the first pixel unit in the first row is connected with the source follower SF in the first voltage detecting sub-circuit, and the pixel electrode of the last pixel unit in the first row is connected with the source follower SF in the second voltage detecting sub-circuit.

Compared with the fifth embodiment, in the sixth embodiment, not only the voltage variation of the pixel electrode of the first pixel unit in the first row but also that of the last pixel unit in the first row can be detected by the detecting circuit for pixel electrode voltage. Moreover, the voltage variations of the pixel electrodes of the pixel units in each column from left to right in the active matrix region can be estimated approximately according to the voltage variations of the pixel electrode of the first pixel unit in the first row and of the last pixel unit in the first row. For example, it is assumed that the voltage variation of the pixel electrode of the first pixel unit is $V_1(t)$, the voltage variation of the pixel electrode of the last pixel unit is $V_n(t)$, a subtraction of the former from the latter resulting $\Delta V_1(t)=V_n(t)-V_1(t)$; it is further assumed that the voltage variation of the pixel electrode of the pixel unit from one column to another is linear or approximate linear, then the difference between voltage variations of the pixel electrodes of the pixel units in two adjacent columns is $\Delta V(t)=\Delta V_t(t)/(n-1)$, thereby the voltage variation of the pixel electrode of the pixel unit in the i-th column in the active matrix region is $V_i(t)=V_1(t)+(i-1)*\Delta V(t)$. In the same way, the voltage variations of the pixel electrodes of the pixel units in all the columns in the active matrix region are obtained, which facilitates subsequent voltage compensation. Certainly, what mentioned above is only an illustrative explanation other than a limitation to the scope of the present invention, and it does not mean that the voltage variation of the pixel electrode of the pixel unit in each row has to comply strictly with the above variation pattern, and there are also other modifications.

Although the invention is disclosed in preferred embodiments as above, the present invention is not intended to be limited thereto. Various alternations and modifications can be made to the present invention by any of those skilled in the art, without departing from the spirit and the scope of the present invention, and accordingly the scope of protection of the present invention should be defined by the appended claims.

What is claimed is:

1. A detecting circuit for pixel electrode voltage of a flat panel display device, wherein the flat panel display device has a plurality of scanning lines and a plurality of data lines crossing with the plurality of scanning lines, the plurality of scanning lines and the plurality of data lines define a plurality of pixel units, and each of the pixel units comprises a pixel switching element and a pixel electrode, the detecting circuit for pixel electrode voltage comprising:
   at least one detecting sub-circuit for pixel electrode voltage, each of which comprising:
      a signal amplifying unit connected with the pixel electrode in the pixel unit, for amplifying a voltage signal of the pixel electrode; and
      a signal detecting unit connected with the signal amplifying unit, for detecting the amplified voltage signal of the pixel electrode from the signal amplifying unit, and outputting a variation in the voltage signal of the pixel electrode with time, wherein
   the detecting circuit for pixel electrode voltage includes two detecting sub-circuits for pixel electrode voltage, and the pixel electrodes in first and last pixel units of a first row of pixel units of the flat panel display device are connected to the signal amplifying units of the two detecting sub-circuits for pixel electrode voltage respectively.

2. The detecting circuit for pixel electrode voltage of the flat panel display device according to claim 1, wherein the pixel switching element is a thin film transistor comprising: a gate connected electrically to the scanning line, for controlling the thin film transistor to turn on or off; a source connected electrically to the data line, for receiving a data signal; and a drain connected electrically to the pixel electrode.

3. The detecting circuit for pixel electrode voltage of the flat panel display device according to claim 1, wherein the flat panel display device is in a frame inversion mode or a line inversion mode, and respective pixel electrodes in a row of pixel units of the flat panel display device are connected in parallel to the signal amplifying unit of one of the detecting sub-circuits for pixel electrode voltage.

4. The detecting circuit for pixel electrode voltage of the flat panel display device according to claim 3, wherein each of the pixel electrodes connected to the signal amplifying unit of each detecting sub-circuit for pixel electrode voltage is a dummy pixel electrode of the flat panel display device.

5. The detecting circuit for pixel electrode voltage of the flat panel display device according to claim 1, wherein the flat panel display device is in a dot inversion mode, and respective pixel electrodes of which the polarities vary uniformly in a row of pixel units of the flat panel display device are connected in parallel to the signal amplifying unit of one of the detecting sub-circuits for pixel electrode voltage.

6. The detecting circuit for pixel electrode voltage of the flat panel display device according to claim 5, wherein each of the pixel electrodes connected to the signal amplifying unit of each detecting sub-circuit for pixel electrode voltage is a dummy pixel electrode of the flat panel display device.

7. The detecting circuit for pixel electrode voltage of the flat panel display device according to claim 1, wherein each signal amplifying unit is a MOS transistor having a gate connected with the pixel electrode of the pixel unit.

8. The detecting circuit for pixel electrode voltage of the flat panel display device according to claim 7, wherein each detecting sub-circuit for pixel electrode voltage further comprises a preset unit located between the MOS transistor serving as the signal amplifying unit and the pixel electrode of the pixel unit connected thereto, for presetting characteristics of the MOS transistor.

9. The detecting circuit for pixel electrode voltage of the flat panel display device according to claim 8, wherein each preset unit is a MOS transistor having a drain connected with the gate of the MOS transistor serving as the signal amplifying unit.

10. The detecting circuit for pixel electrode voltage of the flat panel display device according to claim 1, wherein each signal amplifying unit is a source follower.

11. The detecting circuit for pixel electrode voltage of the flat panel display device according to claim 10, wherein each source follower comprises a first MOS transistor and a second MOS transistor, wherein a drain of the first MOS transistor serves as an input terminal connected with the pixel electrode, a source of the first MOS transistor is grounded, a drain of the first MOS transistor is connected with a drain of the second MOS transistor to serve as an output terminal, and a gate and a source of the second MOS transistor are both connected with a supply voltage.

12. The detecting circuit for pixel electrode voltage of the flat panel display device according to claim 11, wherein each source follower further comprises a preset terminal located at the gate of the first MOS transistor, for presetting characteristics of the source follower.

13. The detecting circuit for pixel electrode voltage of the flat panel display device according to claim 1, wherein the flat panel display device is a thin film transistor liquid crystal display device.

14. The detecting circuit for pixel electrode voltage of the flat panel display device according to claim 1, wherein the pixel electrode connected to the signal amplifying unit of each detecting sub-circuit for pixel electrode voltage is a dummy pixel electrode of the flat panel display device.

* * * * *